United States Patent [19]

Kuchar et al.

[11] Patent Number: 4,899,347
[45] Date of Patent: Feb. 6, 1990

[54] SOLID STATE LASER GAIN MEDIUM WITH DIAMOND COATING

[75] Inventors: Norman R. Kuchar, Burnt Hills; Farzin H. Azad, Clifton Park, both of N.Y.

[73] Assignee: General Electric Company, Schenectady, N.Y.

[21] Appl. No.: 350,265

[22] Filed: May 11, 1989

[51] Int. Cl.⁴ .............................................. H01S 3/00
[52] U.S. Cl. ........................................ 372/33; 372/39
[58] Field of Search ............................ 372/33, 39-42, 372/49, 66, 68

[56] References Cited

U.S. PATENT DOCUMENTS

| | | | |
|---|---|---|---|
| 3,508,165 | 4/1970 | Nicolai | 331/94.5 |
| 3,679,999 | 7/1972 | Chernock | 331/94.5 |
| 3,872,401 | 3/1975 | Cooley | 331/94.5 |
| 4,530,750 | 7/1985 | Aisenberg et al. | 204/298 |
| 4,638,484 | 1/1987 | Rand et al. | 372/42 |
| 4,725,345 | 2/1988 | Sakamoto et al. | 204/192.31 |

OTHER PUBLICATIONS

D. C. Brown et al., "Parasitic Oscillations and Amplified Spontaneous Emission in Face-Pumped Total Internal Reflection Lasers," SPIE, vol. 736, pp. 74-83, 1987.

D. C. Brown et al., "Parasitic Oscillations, Absorption, Stored Energy Density and Heat Density in Active-Mirror and Disk Amplifiers," Applied Optics, Jan. 15, 1978, vol. 17, No. 2, pp. 211-224.

*Primary Examiner*—William L. Sikes
*Assistant Examiner*—B. R. R. Holloway
*Attorney, Agent, or Firm*—Henry I. Steckler; James C. Davis, Jr.; Paul R. Webb, II

[57] ABSTRACT

A laser gain medium has a diamond coating in order to strengthen it and reduce parasitic oscillations. The medium can be a slab with chamfered corners with the coating on the edge faces and the corners, or a rod with the coating going all the way around it to eliminate stress corrosion and provide a compressive stress. The medium can be Nd:YAG and the coating can have a parasitic absorbing dopant. In a laser, the length of the coating preferably is the same as the length of the medium. For the slab, siderails can be used with a length slightly shorter than that of the coating.

20 Claims, 3 Drawing Sheets

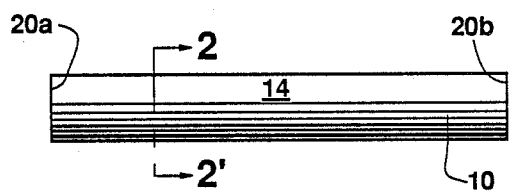
Fig. 1
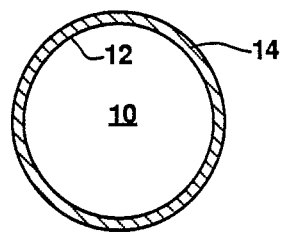
Fig. 2
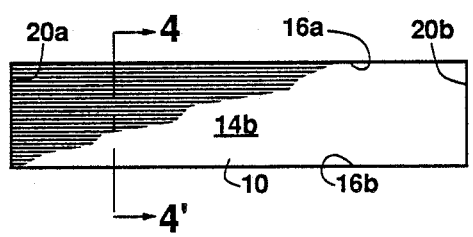
Fig. 3
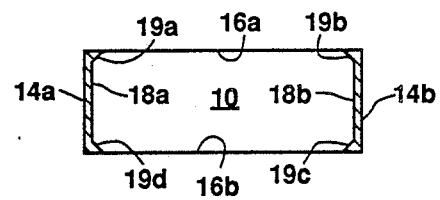
Fig. 4
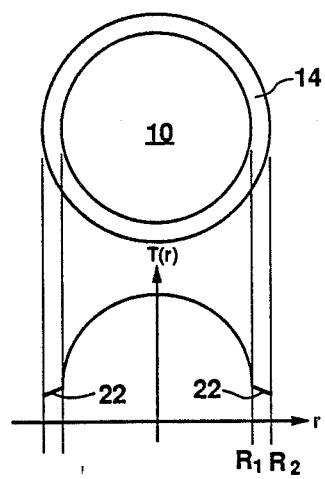
Fig. 5(a)
Fig. 5(b)

4,899,347

SOLID STATE LASER GAIN MEDIUM WITH DIAMOND COATING

BACKGROUND OF THE INVENTION

The present invention relates to a solid state laser gain medium, and more particularly to such a medium for high power operation that has a diamond coating therein.

In a solid state laser having a gain medium, the medium is optically pumped to cause stimulated emission therein. When high power is generated, thermal gradients in the medium (the center being hotter than the outer portions) create circumferential (tangential) and axial tensile stress in the medium. The thermal stress will cause crack growth and possible fracture of the medium; surface damage cracks caused by finishing and handing accelerate this failure. In addition, a coolant, such as water, is normally flowing over and around the medium. This flow can cause stress corrosion of the medium, thereby enhancing the damaging effect of thermal stress.

Another problem is that of parasitic oscillations due to total internal reflections (TIR) at the boundaries of the medium. Such oscillations reduce the power output available from the laser and can also cause damage or cracking of the medium. It is known from the articles "Parasitic Oscillations and Amplified Spontaneous Emission in Face-pumped Total Internal Reflection Lasers," D. C. Brown et al., SPIE, Vol. 736, pp.74–83, 1987, and "Parasitic Oscillations, Absorption, Stored Energy Density and Heat Density in Active-Mirror and Disk Amplifiers," D. C. Brown et al., Applied Optics, Jan. 15, 1978, Vol. 17, No. 2, pp. 211–224, to leave some of the medium faces in a rough ground condition in order to reduce total internal refections and thus parasitic oscillations. However, this reduces the strength of the medium. It is known from U.S. Pat. No. 3,872,401 to use a glass ($SiO_2$) coating or cladding on the gain medium to reduce parasitic oscillations. However, such coatings have insufficient durability when immersed in a flowing coolant due to abrasion and have reactively low tensile strength compared to the medium, which results in such coatings breaking up and flaking off. Such coatings also have low thermal conductivity, which results in a high thermal gradient, and therefore a higher thermal stress, and also have a higher thermal expansion than the medium so that they will eventually flake off if operated at a high power. It is also known from U.S. Pat. No. 3,508,165 to form both the medium and the cladding of lanthanum aluminate, but with different dopants, and thus different indices of refraction, to reduce parasitic oscillations. However such a cladding has relatively low corrosion resistance and tensile strength and a low thermal conductivity.

It is therefore an object of the present invention to both strengthen an optical gain medium and reduce parasitic oscillations therein.

SUMMARY OF INVENTION

An article in accordance with the invention comprises a solid state laser gain medium having an outer surface, and means for reinforcing said medium and for reducing parasitic oscillations comprising a diamond coating disposed on at least a portion of said outer surface.

A laser in accordance with the invention comprises a longitudinal laser medium having an outer surface; a diamond coating on at least a portion of said outer surface for a given length; at least a first optical pumping means for illuminating said medium; and a reflector surrounding said medium and said pumping means.

It is briefly mentioned in U.S. Pat. No. 4,725,345 (col. 3, line 21) to apply a diamond coating to protect a lens; however the primary discussion concerns a diamond coating for loudspeaker diaphragms.

BRIEF DESCRIPTION OF THE DRAWINGS

FIG. 1 is a plan view of a first embodiment of the invention;

FIG. 2 is a cross-sectional view taken along line 2—2' of FIG. 1;

FIG. 3 is a plan view of second embodiment of the invention;

FIG. 4 is a cross-sectional view taken along line 4—4' of FIG. 3;

FIG. 5 is a graph of the temperature distribution in the first embodiment,

In the drawings corresponding reference numerical have been allied to corresponding elements.

DETAILED DESCRIPTION

Figure 6:
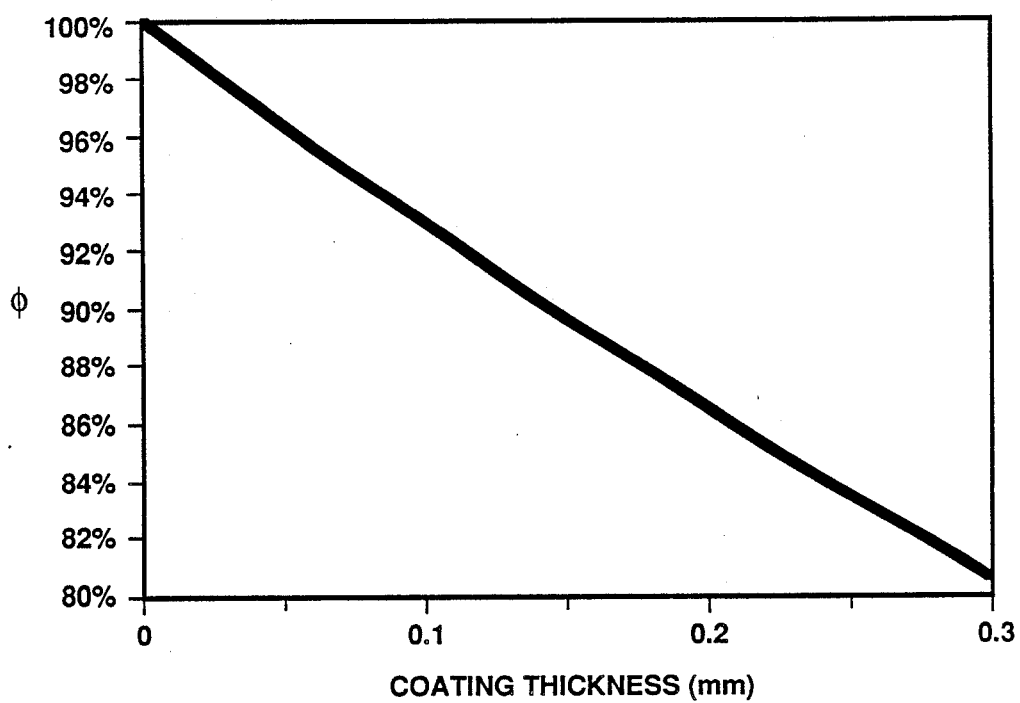
FIG. 6 is a graph of the ratio of surface tangential stress for diamond coated versus uncoated YAG rod.

As shown in FIGS. 1 and 2, a solid state gain medium 10 comprises a longitudinal rod having a circular outer surface 12. Disposed on the outer surface 12 is a diamond coating 14, which is substantially transparence to the pumping energy. The rod 10 typically can have a length of about 6 to 8 inches (15.24 to 20.32 cm) and a diameter of about 0.5 inches (1.27 cm).

In FIGS. 3 and 4 the gain medium 10 has a longitudinal slab (rectangular) geometry and an outer surface thereof comprises pump faces 16a and 16b, sufficiently polished to achieve optical flatness, i.e., within one eight of the emitted wavelengths, and edge faces 18a and 18b, having chamfered corners 19a, 19b, 19c, and 19d, the latter to prevent chipping. Diamond coatings 14a and 14b are respectively present on the edge faces 18 and corners 19. It is desirable to have the coating 14 in the corners 19 since they are stress concentration points and therefore there is a high likelihood of cracks thereat. The slab 10 can typically have a length of about 6 to 8 inches (15.24 to 20.32 cm), a width of about 1 inch (2.54 cm) and a thickness of about 0.25 inch (0.635 cm). Other dimensions can be used for both the slab and the rod.

For both embodiments, and as known in the art, the ends 20a and 20b can be cut at the Brewster angle to reduce reflection losses when the medium 10 is used in a laser. The medium 10 can comprise Nd:YAG with a 1% doping level of Nd; however any laser medium can be used, e.g., Nd:glass, Er:YAG, Nd:GSGG, Nd:GGG, Ti:sapphire, etc. Coatings 14 can extend substantially along the entire length of rod or slab 10.

In both embodiments the coatings 14 reduce the tangential surface stresses due to the high modulus of elasticity, the high thermal conductivity, and the low thermal expansion coefficient of diamond as compared to those of the medium. Further, in the first embodiment, coating 14 provides a compressive circumferential stress that opposes the tensile circumferential stress due to thermal gradients, resulting in a net reduction in circumferential stress, and coating 14 also eliminates the contact between the (described below) and the lasing medium 10, thus eliminating stress corrosion.

FIG. 5(b) shows the temperature profile of a coated rod 10 in FIG. 5(a) under typical operating conditions. It is noted that portions 22 have a low slope due to the high thermal conductivity of diamond. In this geometry, the ratio of the tangential circumferential surface stress of a coated rod to that of an uncoated rod can be approximated as:

$$\phi = 1 - \frac{E_2/E_1}{\frac{1+(R_1/R_2)^2}{1-(R_1/R_2)^2} + \left(\frac{E_2}{E_1}\right)\left(\frac{1-2\nu}{1-\nu}\right) + \frac{\nu}{1-\nu}},$$

wherein E1 and E2 are the elastic modulii of the rod 10 and diamond coating 14, respectively, R1 is the rod 10 radius, R2-R1 is the coating 14 thickness, and $\gamma$ is the Poisson ratio of the rod 10.

FIG. 6 depicts a plot of the stress ratio verses coating thickness for $E_2/E_1 = 3.73$ and $\gamma = 0.25$, which are the values for a YAG rod and a diamond coating. The results show that, because of the favorable mechanical and thermal properties of the diamond layer 14, the coated rod 10 experiences lower tangential surface stress than an uncoated rod for the same pumping power. For this application, higher thermal conductivity to reduce temperature gradients, durability to resist abrasion, and high strength combined with a lower thermal expansion coefficient to provide a compressive tangential stress, make the diamond coating superior to $SiO_2$ coatings.

Figure 7A:
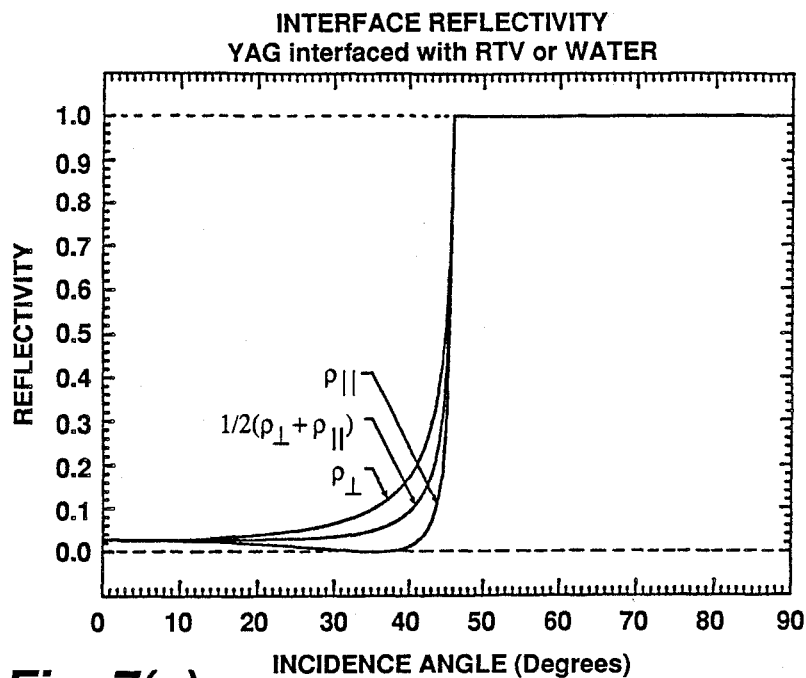
FIG. 7 shows graphs of interface reflectivity for different interfaces.
Figure 7B:
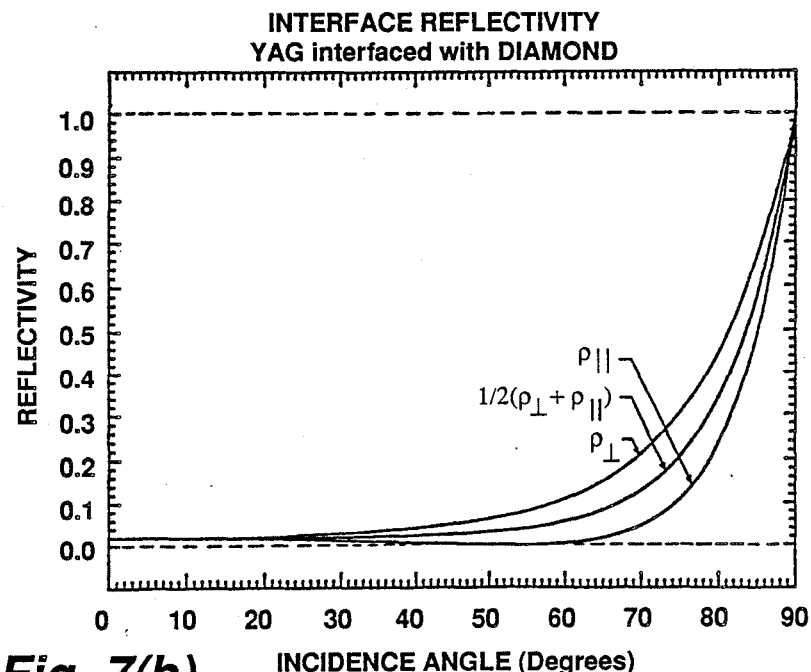

FIG. 7 compares the internal interface reflectivity verses the incident angle of a diamond-coated YAG laser medium in FIG. 7(b) to that of a YAG interface formed with water or room temperature vulcanized (RTV) silicone rubber in FIG. 7(a). Since the indices of refraction of water (about 1.3) and RTV rubber (about 1.4) are nearly equal, FIG. 7(a) can be for both. In the graphs of FIG. 7, $\rho$ is the reflection coefficient, and the subscripts thereof indicate the plane of polarization of the incident ray, i.e., parallel or perpendicular polarization, or the average thereof. Integration of these curves over a hemispherical solid angle results in the hemispherical reflectivity of the interface for uniform irradiation. The corresponding value for the diamond interface is a factor of eight lower than that of a water or RTV interface. This implies that a significant fraction of the radiation incident on the YAG/diamond interface will escape out of the YAG medium, thus reducing the possibility of TIR and hence parasitic oscillations. In this application, also, the higher refractive index of diamond (about 2.4) compared to that of YAG (about 1.8), which is high for a laser medium, makes diamond a particularly practical coating for YAG. An equivalent $SiO_2$ coating, because of its lower refractive index, will behave similar to a water or RTV surrounding.

It will therefore be appreciated that the diamond coating of the invention both strengthens a laser gain medium and reduces parasitic oscillations therein. If desired, a parasitic absorbing dopant, e.g., Cu, Sm, etc., can be present in coating 14 to obtain still further reduction in parasitic oscillations.

The diamond coating 14 can be formed by chemical vapor deposition using a mixture of 97–98% $H_2$ and a 2–3% $CH_4$, which is excited with microwaves, plasma discharge, a laser beam, or a hot filament, and is at a pressure of 10 to 20 Torr with the medium 10 at 900° C. A parasitic absorbing dopant (described above) can be added. For the slab embodiment, several slabs can be coated at one time with their pump faces touching each other to avoid coating these faces. Since the slabs are all made of the same material, a chemical reaction will not take place.

Figure 8:
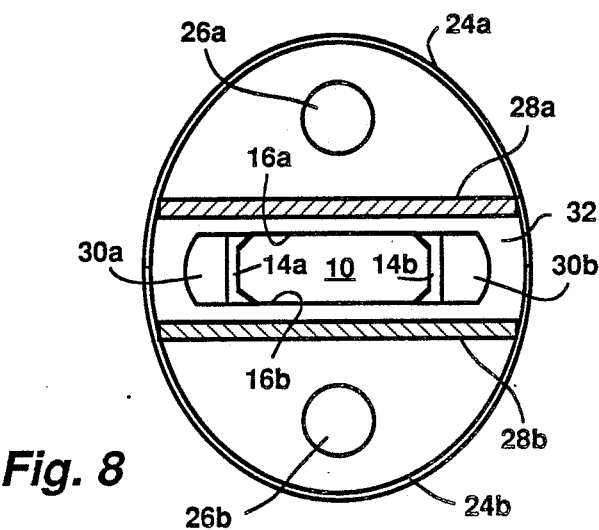
FIG. 8 is a cross-sectional view of the invention used in a laser of a slab or face-pumped design.

FIG. 8 shows the invention as used in a laser similar to that shown in U.S. Pat. No. 3,679,999. A reflector has sections 24a and 24b surrounding optical pumping lamps 26a and 26b to provide light through transparent plates 28a and 28b, such as quartz, to the slab 10 in accordance with the invention. Lamps 26 cause population inversion in slab 10 and are typically 6 inches (15.24 cm) long. Preferably, the coating extends over the entire length of the medium, thereby ensuring that parasitic mode suppression takes place over and beyond the entire pumped region of the medium 10. Instead of lamps, other optical pumping means, such as diode arrays, can be used. Insulating siderails 30a and 30b, such as quartz, are affixed to slab 10 by RTV silicone rubber adhesive (not shown) and preferably, are slightly longer than coatings 14a and 14b. A coolant 32, such as water, a gas, etc., is pumped between the plates 28 in order to cool the pump faces 16. Insulating siderails 30 prevent the coolant 32 from contacting coatings 14a and 14b, and also greatly reduce heat conduction from slab 10 lo coolant 32, thereby reducing any distortion in the emitted laser light that might occur due to deformation of slab 10 and a varying index of refraction due to thermal gradients therein.

What is claimed is:

1. An article comprising:
   a solid state laser gain medium having an outer surface, and means for reinforcing said medium and for reducing parasitic oscillations comprising a diamond coating disposed on at least a portion of said outer surface.
2. The article of claim 1 wherein said outer surface has a substantially circular portion.
3. The article of claim 2 wherein said coating is disposed around all of said circular portion.
4. The article of claim 1 wherein said outer surface has a substantially rectangular portion having a pair of opposing edge faces and a pair of opposing pump faces.
5. The article of claim 4 wherein said medium has chamfered corners, said coating being disposed on said corners and edge faces.
6. The article of claim 4 wherein said coating is disposed on edge faces.
7. The article of claim 1 wherein said coating comprises a parasitic absorbing dopant.
8. The article of claim 7 wherein said dopant comprises Cu.
9. The article of claim 7 wherein said dopant comprises Sm.
10. A laser comprising:
    a longitudinal laser medium having an outer surface;
    a diamond coating disposed on at least a portion of said outer surface for a given length;
    at least a first optical pumping means for illuminating said medium; and
    a reflector surrounding said medium and said pumping means.

11. The laser of claim 10 wherein said pumping means has a length slightly less than said given length of said coating.

12. The laser of claim 10 wherein said medium comprises a slab having a pair of opposing edge faces and a pair of opposing pump faces, said first pumping means illuminating one of said pump faces, and further comprising siderails disposed on said edge faces.

13. The laser of claim 12 wherein said siderails have a length slightly less than said given length of said coating.

14. The laser of claim 12 further comprising first and second transparent plates respectively disposed proximate said medium, said first plate being disposed between said first pumping means and said medium; and a second optical pumping means for illuminating the remaining pump face and disposed in said reflector, said second plate being disposed between said second pumping means and said slab.

15. The laser of claim 10 further comprising a coolant disposed between said plates.

16. The laser of claim 10 wherein said optical pumping means comprises a lamp.

17. The laser of claim 10 wherein said medium comprises a slab having a pair of opposing edge faces and a pair of opposing pump faces, said coating being disposed on said edge faces.

18. The laser of claim 16 wherein said medium has chamfered corners, said coating being disposed on said corners.

19. The laser of claim 10 wherein said medium is a rod having a substantially circular outer surface, said coating being disposed around all of said circular outer surface.

20. The laser of claim 10 wherein said coating comprises a parasitic absorbing dopant.

* * * * *